US008170226B2

(12) United States Patent
Prakash et al.

(10) Patent No.: US 8,170,226 B2
(45) Date of Patent: May 1, 2012

(54) ACOUSTIC ECHO CANCELLATION AND ADAPTIVE FILTERS

(75) Inventors: Vinod Prakash, Redmond, WA (US); Chao He, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 967 days.

(21) Appl. No.: 12/143,587

(22) Filed: Jun. 20, 2008

(65) Prior Publication Data

US 2009/0316924 A1 Dec. 24, 2009

(51) Int. Cl.
*A61F 11/06* (2006.01)
*H04M 9/08* (2006.01)

(52) U.S. Cl. .............. 381/71.1; 381/71.11; 381/94.1; 381/94.2; 379/406.01; 379/406.06; 379/406.08

(58) Field of Classification Search .......... 381/71.7, 381/71.1, 71.6, 71.11, 94.1, 94, 2; 379/406.01, 379/406.08, 406.14, 406.05, 406.06
See application file for complete search history.

(56) References Cited

U.S. PATENT DOCUMENTS

| 5,889,857 | A | | 3/1999 | Boudy et al. |
| 5,933,495 | A | * | 8/1999 | Oh ............................ 379/406.08 |
| 5,937,060 | A | * | 8/1999 | Oh ............................ 379/406.14 |
| 6,246,760 | B1 | | 6/2001 | Makino et al. |
| 6,483,532 | B1 | * | 11/2002 | Girod ......................... 348/14.12 |
| 6,563,803 | B1 | * | 5/2003 | Lee ................................ 370/290 |
| 6,580,696 | B1 | * | 6/2003 | Chen et al. ..................... 370/286 |
| 6,628,781 | B1 | | 9/2003 | Grundstrom et al. |
| 6,678,376 | B1 | * | 1/2004 | Takahashi et al. ....... 379/406.01 |
| 6,968,064 | B1 | | 11/2005 | Ning |
| 7,016,488 | B2 | | 3/2006 | He et al. |
| 7,110,554 | B2 | * | 9/2006 | Brennan et al. .............. 381/94.7 |
| 7,433,463 | B2 | * | 10/2008 | Alves et al. ............... 379/406.14 |
| 7,773,759 | B2 | * | 8/2010 | Alves et al. .................. 381/71.1 |
| 7,925,007 | B2 | * | 4/2011 | Stokes et al. ............. 379/406.08 |
| 7,991,146 | B2 | * | 8/2011 | Beaucoup ................ 379/406.04 |
| 2005/0220043 | A1 | | 10/2005 | Handel et al. |
| 2006/0188089 | A1 | | 8/2006 | Diethorn et al. |
| 2007/0041575 | A1 | | 2/2007 | Alves et al. |
| 2007/0121928 | A1 | | 5/2007 | Beaucoup |
| 2007/0165838 | A1 | | 7/2007 | Li et al. |

OTHER PUBLICATIONS

Douglas, "Filter Design Toolbox 4.3", 1994-2008, The MathWorks, Inc., pp. 6.
Eneroth, et al., "A Real-Time Implementation of a Stereophonic Acoustic Echo Canceler", IEEE Transactions on Speech and Audio Processing, vol. 9, No. 5, Jul. 2001, IEEE, pp. 513-523.
Margo, et al., "Multiple Short-Length Adaptive Filters for Time-Varying Echo Cancellations", 1993 IEEE International Conference on Acoustics, Speech, and Signal Processing, IEEE, 1993, pp. 161-164.

* cited by examiner

*Primary Examiner* — Anh Mai
*Assistant Examiner* — Joselito Baisa
(74) *Attorney, Agent, or Firm* — Capitol City TechLaw; Richard C. Irving

(57) ABSTRACT

In one embodiment, a two-way telecommunication device may perform acoustic echo cancellation on incoming signals. An audio decoding module may produce an audio render signal. An audio capture interface may receive an audio capture signal. A short length adaptive filter may determine a time delay between the audio render signal and the audio capture signal by adaptively predicting a sub-band of the audio capture signal using a corresponding sub-band of the audio render signal.

20 Claims, 4 Drawing Sheets

ACOUSTIC ECHO CANCELLATION AND ADAPTIVE FILTERS

BACKGROUND

In a two channel, full-duplex voice communication system, strong acoustic coupling between the transmit point and the receive point of a channel may lead to echoes occurring in the conservation. Acoustic echo cancellation (AEC) signal processing technology may be used to remove these echoes.

AEC signal processing may rely on accurate alignment between the speaker and microphone streams. Depending on the specific device or driver in use, if the reported delay between speaker and microphone streams is less than the physical delay, the AEC may compensate with only minor loss in echo cancelation quality by buffering the speaker values for cancelation. However, if the reported delay is more than the physical delay, the AEC may be unable to function due to a lack of causality. Severe misalignment, such as beyond a few tens of milliseconds, may have an adverse impact on other echo control modules, such as voice switching or microphone fading. Therefore, echo-free communication, for full or half duplex communication, may rely on alignment within twenty milliseconds of the physical delay between the speaker and microphone streams.

Cross correlation may be used to determine alignment, but cross correlation may suffer from some major drawbacks. Searching over a large number of possible delay values to determine the physical delay may lead to a high computational complexity. Also, the inevitable presence of glitches in a system may break the correlation calculations.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to acoustic echo cancellation. A two-way telecommunication device may perform acoustic echo cancellation on incoming signals. An audio decoding module may produce an audio render signal. An audio capture interface may receive an audio capture signal. A short length adaptive filter may determine a time delay between the audio render signal and the audio capture signal by adaptively predicting a sub-band of the audio capture signal using the corresponding sub-band of the audio render signal.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Acoustic echo cancellation (AEC) is a digital signal processing technology which may remove the echo from a speaker phone in a two-way or multi-way communication system, such as a traditional telephone or a modern internet audio conversation application. A two-way telecommunication device may perform AEC on outgoing signals. An audio decoding module may produce an audio render signal. An audio capture interface may receive an audio capture signal. A number of short length adaptive filters placed at different sub-bands and different delays may determine a time delay between the audio render signal and the audio capture signal by finding the short length adaptive filters with the largest prediction ability based on echo return loss enhancement (ERLE).

Figure 1:
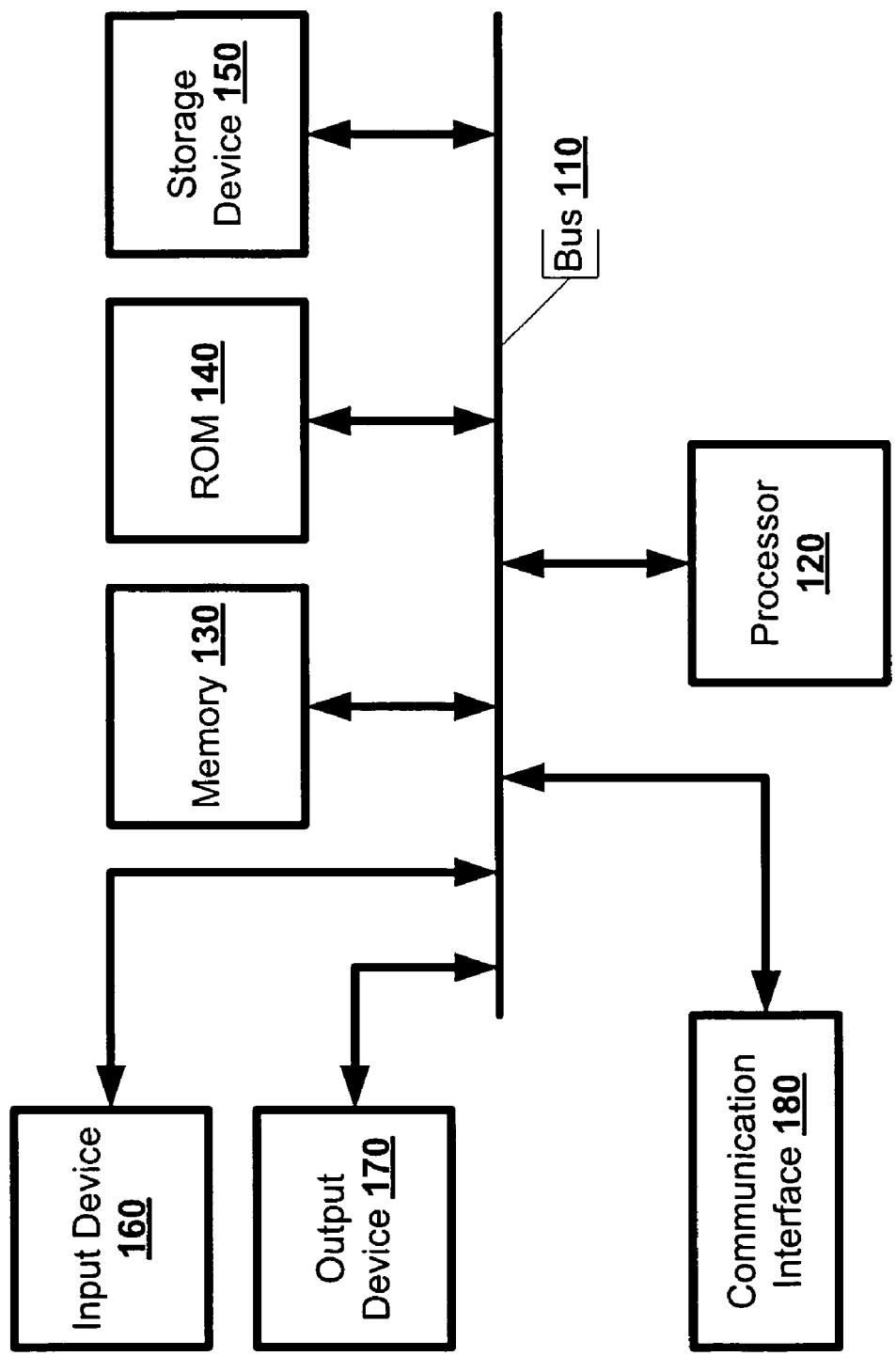
FIG. 1 illustrates a block diagram of an exemplary telecommunication device that may be used to perform acoustic echo cancellation.

FIG. 1 illustrates a block diagram of an exemplary telecommunication device 100 that may use AEC technology. Telecommunication device 100 may be a personal computer, laptop, an internet protocol (IP) telephone, or other device capable of performing higher end telecommunication functions. Telecommunication device 100 may include a bus 110, a processor 120, a memory 130, a read only memory (ROM) 140, a storage device 150, an input device 160, an output device 170, and a communication interface 180. Bus 110 may permit communication among the components of telecommunication device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive.

Input device 160 may include one or more conventional mechanisms that permit a user to input information to telecommunication device 100, such as a microphone, keypad, etc. Output device 170 may include one or more conventional mechanisms that output information to the user, including a display, one or more speakers, a headset, or other output device. Communication interface 180 may include any transceiver-like mechanism that enables processing device 100 to communicate with other devices or networks. The interface may be a wireless, wired or optical interface.

Telecommunication device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Figure 2:
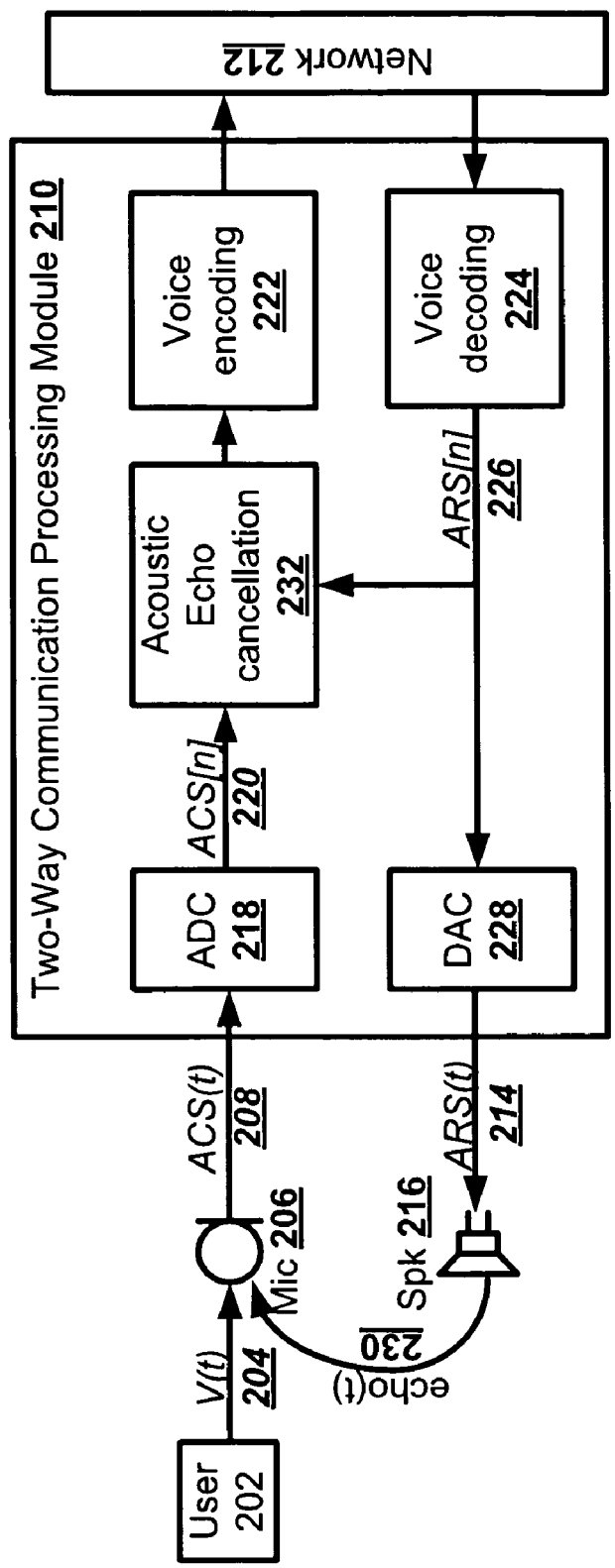
FIG. 2 illustrates, in a block diagram, one embodiment of a two-way telecommunication device.

FIG. 2 illustrates, in a block diagram, one end of a typical two-way communication system 200. A user 202 may speak, projecting a user's voice (V(t)) 204 into an audio capture interface, such as a microphone 206, to capture an audio signal. Microphone 206 may send an audio capture signal (ACS(t)) 208 into a two-way communication processing module 210 to be transmitted through a network 212. Two-way communication processing module 210 may receive a signal from the network 212 to convert into an audio rendering signal (ARS(t)) 214 to be broadcast by an acoustic rendering interface, such as a speaker 216.

Two-way communication processing module 210 may use an analog to digital converter (ADC) 218 to convert ACS(t) 208 to a digital signal (ACS[n]) 220 before processing the signal for transmission on the network 212 using a voice encoding module 222. Two-way communication processing module 210 may decode the signal from the network 212 using a voice decoding module 224. Two-way communication processing module 210 may convert the digital output (ARS[n]) 226 of the voice decoding module 224 to analog signal ARS(t) 214 using a digital to analog converter (DAC) 228.

The telecommunication system at the other end may be similar. In such a system, the voice and other audio inputs of a far end user may be played through speaker 216 and captured by microphone 206 as an acoustic echo (echo(t)) 230. Echo(t) 230 may be sent back to the far end so the far-end user may hear his or her voice with a certain delay, causing a problem to the conversation. In order to solve this problem, communication device 200 may use an AEC module 232 to cancel or remove echo (t) 230 from ACS(t) 208.

Typically, echo(t) 230 may be modeled as a speaker signal convolved by a finite, linear, and time-invariant room response filter, which also may be referred to as an echo path, as shown in the following equation:

$$\text{echo}(t) = ARS(t) * g(t) = \int_0^{T_e} g(\tau) \cdot ARS(t-\tau) d\tau,$$

where g(t) is room response filter, and $T_e$ is echo length that depends on the size of the room and the material of any reflection surfaces.

AEC may be realized by finding the room response filter, calculating echoes, and subtracting echoes from ACS(t) 208. However a room response filter may be highly variable, making prior calculations difficult and a fixed filter less useful. An adaptive algorithm may be used to adaptively find g(t).

AEC may be carried out using sampled and digitized versions of ACS(t) 208 and ARS(t) 214. These digital signals, or streams of samples, may be referred to as ACS[n] 220 and ARS[n] 226, respectively. AEC module 232 may operate on the two streams of ACS[n] 220 and ARS[n] 226 samples. These two streams generally may be sampled from ACS(t) 208 and ARS(t) 214 by two different sampling clocks and may each be subject to delays. Accordingly, the same indices in the two streams may not necessarily be aligned in physical time. AEC module 224 may compute a relative sample offset with respect to the same physical time between the two streams. AEC module 224 may compute the offset from the audio capture timestamp of ACS[n] 220 and audio render timestamp of ARS[n] 226, as the timestamp may represent the physical time when a sample is rendered or is captured. A timestamp compensation algorithm may align the two data streams as best as possible, accounting for glitches, clock drift, and other issues. The timestamp compensation algorithm may return adjusted signals where the audio samples of corresponding indices are meant to refer to the same physical time.

If ACS[n] 220 and ARS[n] 226 truly refer to the same physical time, acoustic echo cancellation may be directly applied on them. However, the timestamp may not always be accurate so ACS[n] 220 and ARS[n] 226 may not be aligned after timestamp compensation. Further refinement of the alignment of ACS[n] 220 and ARS[n] 226 may be accomplished by use of a searching approach in the sub-band domain. In a sub-band approach, the ACS[n] 220 may be first passed through a bank of K analysis filters, where K is the number of analysis filters. The bank of analysis filters may produce vectors of sub-band signals ACS[n,k], where k=1 to K. AEC module 224 may perform adaptive echo cancellation in each sub-band. AEC module 224 may pass the resultant sub-band error signals through a synthesis filter to yield a full band signal. In each sub-band, as signal bandwidth is reduced, sampling rate may be reduced, or decimated. The reduction factor M may be less than the number of sub-bands K. The sub-band approach may reduce computational complexity because of down-sampling and may improve convergence rate because the sub-band signal spectra may be more nearly uniform than the full-band signal.

Figure 3:
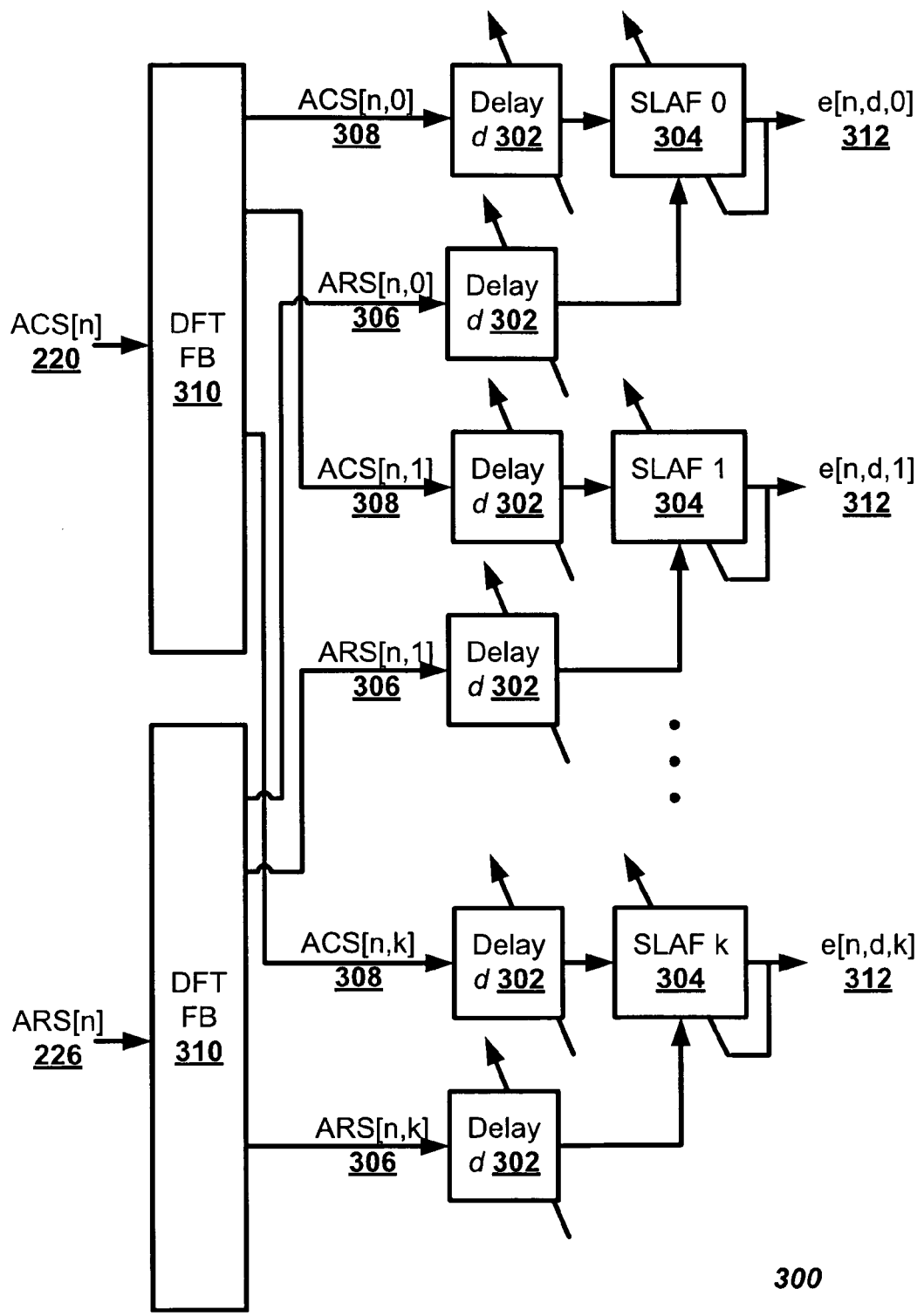
FIG. 3 illustrates, in a block diagram, one embodiment of a bank of analysis filters using short length adaptive filters.

FIG. 3 illustrates, in a block diagram, one embodiment of a bank of analysis filters 300 in the AEC module 232 for a group of k sub-bands for a specific sub-band domain sample offset delay d 302. AEC module 232 may have multiple such modules 300. A short length adaptive filter (SLAF) module 304 may take one or more samples of ARS[n,k] 306 and ACS[n,k] 308 in sub-band k. For ARS[n] 226, a discrete Fourier transform (DFT) filter bank (FB) 310 may divide digital signal ARS[n] 226 into sub-band k sample of ARS[n,k] 306. For ACS[N] 220, DFT FB 310 may divide digital signal ACS[n] 220 into sub-band k sample of ACS[n,k] 308. SLAF module 304 may estimate the echo [n,k,d] by using the speaker signal from ARS[n−d,k] to ARS[n−d−L, k], where d is an adjustable delay 302, and L is the length of the short filter. SLAF module 304 may then produce an output signal e[n,k,d] 312 representing the echo cancelled signal. An adjustable delay 302 may be placed on both ACS[n,k] sub-band 308 and ARS[n,k] sub-band 306, allowing a delay index to be checked in both a positive and negative direction.

SLAF modules 304 may be used to determine the true delay between ARS[n,k] 306 and ACS[n,k] 308. Since the true physical delay may be larger or smaller than the delay reported by the timestamp, SLAF module 304 may search for an optimal delay index for both causal-delay (positive) search range and acausal-delay (negative) search range. As a means to determine true physical delay between ARS[N] 306 and ACS[n] 308 as a function of time, frequency, and delay, an ERLE value may be determined using the following function:

$$ERLE[d,k] = \text{var}(ACS[n,k])/\text{var}(ACS[n,k] - \text{echo}[n,k,d])$$

Where d is delay; n is a time frame index; k is a sub-band frequency index; echo [n,k,d] is the estimated echo in ACS [n,k] 308 using speaker signals from ARS[n−d[n],k] to ARS [n−d[n]−L, k]; and var( ) is a variance computed using recursive averaging across sample indices. For each delay index d, a representative ERLE may be computed as ERLE(d) $\max_k$ (ERLE[d,k]) where k ranges over the sub-bands considered. ERLE(d) may be averaged over time to smooth out statistical variations.

Each sub-band of ARS[n,k] 306 and ACS[n,k] 308 may have a SLAF module 304. AEC module 224 may determine an optimal SLAF module 304 for each delay increment based on the ERLE of the SLAF module 304. After an optimal SLAF module 304 for each delay increment is found, the AEC module 224 may select a SLAF module 304 based again on the ERLE. The delay increment for SLAF module 304 may be considered the time delay between the audio render signal and the audio capture signal. The calculations of the ERLE may be performed by programmable logic, firmware, hardware, a processor executing a software application, or other methods.

Figure 4:
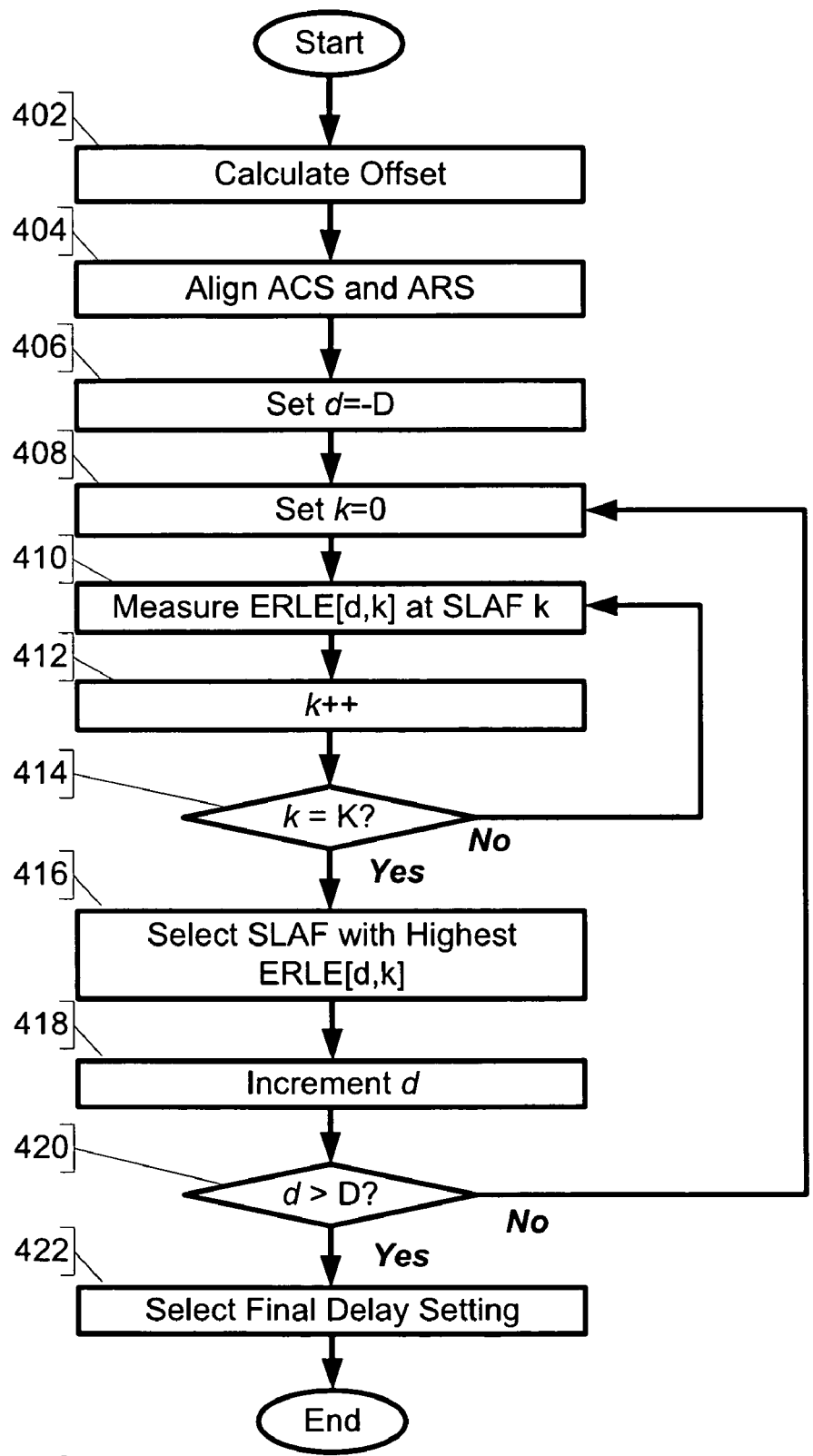
FIG. 4 illustrates, in a flowchart, one embodiment of a method 400 of using a short length adaptive filter module to determine an echo delay.

FIG. 4 illustrates, in a flowchart, in one embodiment of a method 400 of using SLAF modules 304 to determine the delay between ACS[N] 220 and ARS[n] 226. AEC module 232 may have a total of K SLAF modules 304, one for each of K sub-bands of ARS[n,k] 306 and ACS[n,k] 308. AEC module 232 may calculate an initial offset using the audio render timestamp and the audio capture timestamp (Block 402). AEC module 232 may use the initial offset to align ARS[N] 306 and ACS[n] 308 (Block 404). AEC module 232 may set a test delay setting d to a negative D, where D represents the maximum probable delay (Block 406). AEC module 232 may set a SLAF module 304 pointer k to zero (Block 408) and, at the delay setting d, may have a total of K sub-band SLAF modules 304, one for each of K sub-bands of ARS[n] 306 and ACS[n] 308. AEC module 232 may measure ERLE[d,k] at SLAF module k for a test delay setting d (Block 410). AEC module 232 may increment k (Block 412). If SLAF module 304 pointer k does not equal the maximum number of sub-bands k (Block 414), then the next SLAF module 304 measures ERLE [d,k] (Block 410). If the maximum number of sub-bands K has been reached (Block 414), then AEC module 232 may select the SLAF module 304 for that test delay setting that has the highest ERLE to obtain ERLE[D] (Block 416). AEC module 232 may increment the test delay setting (Block 418). If the maximum test delay setting D has not been reached (Block 420), AEC module 232 may apply test delay setting d to again obtain ERLE[d]. If the maximum test delay setting D has been reached (Block 420), then AEC module 232 may select the final test delay setting corresponding to the highest ERLE among all ERLE[D] as an estimate of the speaker 216 to microphone 206 alignment offset with respect to the initial offset used (Block 422).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method for performing acoustic echo cancellation, comprising:
    calculating, by an acoustic echo canceling module, an initial offset with respect to an audio render signal and an audio capture signal;
    dividing, by a filter bank, samples of the audio capture signal into sub-band samples of the audio capture signal for a plurality of sub-bands;
    dividing, by the filter bank, samples of the audio render signal into sub-band samples of the audio render signal for the plurality of sub-bands;
    setting a delay to an initial value;
    producing, by respective short length adaptive filters, a respective output signal representing echo cancelled signal[n, k, d], where n is a time frame index, k is a sub-band index, and d is a delay index, each of the respective short length adaptive filters corresponding to a different respective one of the plurality of sub-bands, the respective short length adaptive filters receiving, as input, an audio capture signal[n−d, k] for a corresponding sub-band and an audio render signal[n−d, k] for the corresponding sub-band;
    calculating echo return loss enhancement[d, k] for a delay corresponding to the delay index, d, for each of the plurality of sub-bands, based on the audio capture signal [n−d, k] and the echo cancelled signal[n, k, d];
    selecting the echo return loss enhancement[d, k], from among all of the plurality of sub-bands, having a highest value to obtain echo return loss enhancement[d] for the delay;
    incrementing the delay index d;
    repeating the producing, the calculating, the selecting and the incrementing until the delay index d corresponds to a delay that is greater than a given maximum delay; and
    selecting a final test delay setting corresponding to a highest echo return loss enhancement from among all of the echo return loss enhancement[d] as an estimate of a speaker to microphone alignment offset with respect to the calculated initial offset, when the delay is greater than the given maximum delay.

2. The machine-implemented method of claim 1, wherein the given maximum delay is a maximum probable delay.

3. The machine-implemented method of claim 2, wherein the setting a test delay, d, to an initial value comprises:
    setting the test delay to a negative value corresponding to a negative of the maximum probable delay.

4. The machine-implemented method of claim 1, wherein the echo return loss enhancement[d, k] is calculated by dividing a variance of audio capture signal[n, k] by a variance of a value calculated by subtracting echo[n, k, d] from acoustic capture signal[n, k, d].

5. The machine-implemented method of claim 4, wherein the variances are calculated using recursive averaging across sample indices.

6. The machine-implemented method of claim 1, wherein the filter bank is a discrete Fourier transform filter bank.

7. The machine-implemented method of claim 1, wherein the producing, by respective short length adaptive filters, a respective output signal representing echo cancelled signal[n, k, d] further comprises:
    estimating the echo cancelled signal[n, k, d] by using a speaker signal from the audio render signal[n−d, k] to audio render signal[n−d−L, k], where L is a length of a respective short length adaptive filter.

8. The method of claim 1, further comprising:
calculating an initial value of the offset based upon an audio capture timestamp and an audio render timestamp; and
aligning the audio capture signal and the audio render signal based on the offset.

9. A two-way communication device with acoustic echo cancellation, comprising:
an audio decoding module to produce an audio render signal;
an audio capture interface to receive an audio capture signal;
a filter bank for dividing samples of the audio render signal into sub-band samples of the audio render signal for a plurality of sub-bands and for dividing samples of the audio capture signal into sub-band samples of the audio capture signal for the plurality of sub-bands;
a plurality of short length adaptive filters, each of the plurality of short length adaptive filters corresponding to a different respective one of the plurality of sub-bands, each of the plurality of short length adaptive filters being configured to receive, as input, an audio capture signal [n–d, k] for a corresponding one of the plurality of sub-bands, where n is a time frame index, d is a delay index corresponding to a delay, and k is a sub-band index, and an audio render signal[n–d, k] for the corresponding one of the plurality of sub-bands to produce a respective output signal representing an echo cancelled signal[n, k, d] for the corresponding one of the plurality of sub-bands;
at least one processor configured to perform:
calculating echo return loss enhancement[d, k] for the delay, for each of the plurality of sub-bands, based on the audio capture signal[n–d, k] and the echo cancelled signal[n, k, d];
selecting the echo return loss enhancement[d, k], from among all of the plurality of sub-bands, having a highest value to obtain echo return loss enhancement [d] for the delay,
incrementing the delay index d, each of the plurality of short length adaptive filters producing an echo cancelled signal[n, k, d];
repeating the calculating, the selecting and the incrementing until the delay index d corresponds to a delay that is greater than a given maximum delay; and
selecting a final test delay setting corresponding to a highest echo return loss enhancement from among all of the echo return loss enhancement[d] as an estimate of a speaker to microphone alignment offset with respect to an initial offset, when the delay is greater than the given maximum delay.

10. The two-way communication device of claim 9, wherein the at least one processor is further configured to calculate an offset based upon an audio capture timestamp and an audio render timestamp.

11. The two-way communication device of claim 9, wherein the given maximum delay is a maximum probable delay.

12. The two-way communication device of claim 11, wherein an initial value of the delay is set to a negative value corresponding to a negative of the maximum probable delay.

13. The two-way communication device of claim 9, wherein the echo return loss enhancement[d, k] is calculated by dividing a variance of audio capture signal[n, k] by a variance of a value calculated by subtracting echo[n, k, d] from acoustic capture signal[n, k, d].

14. The two-way communication device of claim 9, wherein the filter bank is a discrete Fourier transform filter bank.

15. A tangible machine-readable medium having a set of instructions stored thereon for a method to be executed by at least one processor, the method comprising:
dividing samples of the audio capture signal into sub-band samples of the audio capture signal for a plurality of sub-bands;
dividing samples of the audio render signal into sub-band samples of the audio render signal for the plurality of sub-bands;
setting a test delay to an initial value;
producing a plurality of respective output signals, each one of the plurality of respective output signals representing echo cancelled signal[n, k, d], where n is a time frame index, k is a sub-band index, and d is a delay index, each of the respective output signals corresponding to a different respective one of the plurality of sub-bands, each of the respective output signals being produced based on an audio capture signal[n–d, k] for a corresponding sub-band and an audio render signal[n–d, k] for the corresponding sub-band;
calculating echo return loss enhancement[d, k] for a delay corresponding to the delay index, d, for each of the plurality of sub-bands, based on the audio capture signal [n–d, k] and the echo cancelled signal[n, k, d];
selecting the echo return loss enhancement[d, k], from among all of the plurality of sub-bands, having a highest value to obtain echo return loss enhancement[d] for the delay;
incrementing the delay index d;
repeating the producing, the calculating, the selecting and the incrementing until the delay index d corresponds to a delay that is greater than a given maximum delay; and
selecting a final test delay setting corresponding to a highest echo return loss enhancement from among all of the echo return loss enhancement[d] as an estimate of a speaker to microphone alignment offset with respect to a calculated offset, when the delay is greater than the given maximum delay.

16. The tangible machine-readable medium of claim 15, wherein the echo return loss enhancement[d, k] is calculated by dividing a variance of audio capture signal[n, k] by a variance of a value calculated by subtracting echo[n, k, d] from acoustic capture signal[n, k, d].

17. The tangible machine-readable medium of claim 16, wherein the variances are calculated using recursive averaging across sample indices.

18. The tangible machine-readable medium of claim 15, wherein the dividing samples of the audio capture signal and the dividing signals of the audio render signal are performed by using a discrete Fourier transform filter bank.

19. The tangible machine-readable medium of claim 15, wherein the producing a plurality of respective output signals further comprises:
estimating the echo cancelled signal[n, k, d] by using a speaker signal from the audio render signal[n–d, k] to audio render signal[n–d–L, k], where L is a length of a respective short length adaptive filter.

20. The tangible machine-readable medium of claim 15, wherein the calculating an initial offset further comprises:
calculating an initial value of the offset based upon an audio capture timestamp and an audio render timestamp; and
aligning the audio capture signal and the audio capture signal based on the offset.

* * * * *